Nov. 18, 1969 D. E. MACK 3,479,597

DICODE DECODER

Filed Dec. 17, 1964 2 Sheets-Sheet 1

INVENTOR.
DONALD E. MACK
BY Anthony D. Cennamo
Joseph F. Rosenthal

Nov. 18, 1969 D. E. MACK 3,479,597

DICODE DECODER

Filed Dec. 17, 1964 2 Sheets-Sheet 2

INVENTOR.
DONALD E. MACK
BY Anthony D. Cennamo
Joseph J. Rosenthal

United States Patent Office 3,479,597

Patented Nov. 18, 1969

3,479,597

DICODE DECODER

Donald E. Mack, West Webster, N.Y., assignor to Xerox Corporation, Rochester, N.Y., a corporation of New York Filed Dec. 17, 1964, Ser. No. 419,151
Int. Cl. H04b 1/16
U.S. Cl. 325—321 4 Claims

ABSTRACT OF THE DISCLOSURE

A decoder circuit for a dicode, or three-level signal. The input dicode signal is peak rectified, amplified and inverted to provide symmetrical pulse and minus voltages which are proportional to the peak level of the pulse input. The input signal is also applied to a reversible polarity integrator which integrates between limiting levels established by the plus and minus supply voltages at a rate proportional to the supply voltage difference. Black-white decision is made on the basis of the potential on the integrating capacitor passing through zero, which is indicative of half the energy of an average amplitude input pulse. Once a decision has been made, a feedback loop gives the circuit additional immunity to the effects of successive narrow noise pulses of a particular polarity, which might otherwise be integrated to a value sufficient to cause erroneous black-white decisions to be made.

Background of the invention

This application relates to a pulse decoding circuit and method adapted for use in receiving data-sets.

Data-set is a term which has come to indicate the apparatus used to couple binary or digital-type transmitters and receivers to a communications link. At the transmitter location, the data-set converts a two-level input signal, from a device such as computer or a facsimile transmitter, into some other form lying in the same baseband frequency domain, but which is more compatible with the transmission link. At the receiving location, which may be thousands of miles away, the data-set receives the transmitted signals from the transmission link, and decodes them into a replica of the original two-level signal for utilization by a facsimile receiver, or the like. The transmission link may also include various modulators and demodultaors. The decoding problem at the receiving location is difficult because the transmission link, whatever its nature, is generally subject to fading and also adds various types of noise to the transmitted signal. In the past, decoding circuits have involved the use of accurate automatic gain control circuits to remove the effects of fading, followed by level detectors, such as Schmitt trigger circuits, to discriminate between signal pulses and noise pulses.

In my copending application, Ser. No. 419,156, filed on even date herewith, I disclosed improved means for decoding dicode signals in the presence of noise. I accomplished this by integrating a dicode signal, detecting transitions through the median value of the integrated signal, and by providing a latching feedback loop to further provide immunity against unipolarity noise pulses. In accordance with said application, however, it was necessary to employ an automatic gain control amplifier or some equivalent means for providing my decoder circuit with input signals of uniform amplitude. I have now improved upon the invention of said application by discovering a method of decording dicode signals of varying amplitude while retaining the noise rejection features of said application.

Objects

Accordingly, it is an object of my invention to provide improved means and methods for decoding variable amplitude signals, particularly the type known as dicode signals, in the presence of noise.

It is a further object to provide decoding means and methods exhibiting improved noise rejection properties coupled with improved tolerance to variable signal levels. Subsidiary objects will become apparent on reading this specification.

In general, I accomplish my objectives by integrating a dicode signal, symmetrically limiting the integrated signal to a value proportional to the dicode signal amplitude, and detecting transitions through the average or median value of the integrated signal. As a further feature of the invention, I provide a latching feedback loop controlled by signal amplitude to further provide immunity against unipolarity noise pulses.

Description of the drawings

For a more detailed description of the invention, reference will be had to the accompanying drawings in which.

Detailed description of the invention

Figure 1:
FIG. 1 represents a typical binary waveform.
Figure 2A:
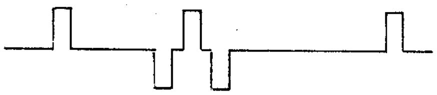
FIGS. 2*a* and 2*b* represent dicode versions of FIG. 1.

FIG. 1 represents an arbitrary two-level waveform representative of signals which are desired to be transmitted over long distances. FIG. 2*a* shows the waveform of FIG. 1 after passing through a common type of transmitting data-set. Each positive-going transition of FIG. 1 has been replaced by a positive pulse of fixed amplitude and each negative-going transition of FIG. 1 has been replaced by a negative pulse of the same amplitude. This type of coding is known as "dicode." It is a three-level type of signal with equal positive and negative pulses superimposed on a base line voltage. It is equally applicable to synchronous or non-synchronous signals. The waveform of FIG. 2*a* is normally filtered, either before or during transmission, to remove the higher frequency components. This results in the waveform of FIG. 2*b*, which is representative of the waveform which would appear at a receiving data-set in the absence of noise. It is the function of the receiving data-set to decode the waveform of FIG. 2*b* back to the waveform of FIG. 1. The signal pulses of FIG. 2*b* should be separated from noise pulses as reliably as possible and with as little phase jitter as possible. This invention is concerned with a circuit and method adapted to decode or translate a waveform of the type shown in FIG. 2*b* to a waveform of the type shown in FIG. 1.

Figure 2B:
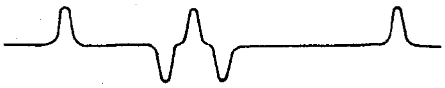

The conventional manner of decoding a signal of the type shown in FIG. 2*b* involves detecting the times when the absolute value of the signal voltage passes through one-half the peak voltage in an increasing direction. Such crossings of the half peak voltage value are taken as indicative of the presence of a dicode signal pulse. The half peak threshold is chosen to provide greatest noise immunity. For example, a positive dicode pulse will be recognized even if there is simultaneously present a negative noise pulse, as long as the noise pulse has less than half the amplitude of the dicode signal pulse. Similarly, a signal pulse will not be falsely detected unless a noise pulse is present having an amplitude at least half as great as a true signal pulse. This form of detection discriminates between signal pulses and noise pulses on the basis of amplitude only. I have found it possible to obtain proved rejection of noise by discriminating between signal pulses and noise pulses on the basis of pulse energy rather than pulse amplitude. In this manner, I achieve greater immunity to the effects of noise pulses which may have a large instantaneous amplitude but a short duration in relation ot a signal pulse.

Figure 3:
FIG. 3 represents an integrated dicode waveform.

FIG. 3 shows the dicode waveform of FIG. 2*b* after it has been integrated by any suitable integrating means. This integrated waveform is a measure of pulse energy. Precisely speaking, energy is proportional to the time integral of the square of the signal voltage, but I have not found it necessary or desirable to square the signal waveform. It can be seen that the peaks of the pulses of FIG. 2*b* correspond in general to mid-points in the waveform of FIG. 3. For convenience, FIGURES 1, 2, and 3 are drawn to the same time scale. Accordingly, such a mid-point represents half the energy of the pulse of FIG. 2*b* and also represents a suitable criteria for determining the presence of a signal pulse. If the waveform of FIG. 3 is symmetrical around zero potential, then every zero crossing in FIG. 3 will be indicative of a received dicode pulse. A dashed line is included in FIG. 3 to represent a median or ground potential. In general, the integrated value of random short noise pulses will not be sufficient to cause the waveform of FIG. 3 to execute a zero crossing and be detected as a spurious pulse.

Figure 4:
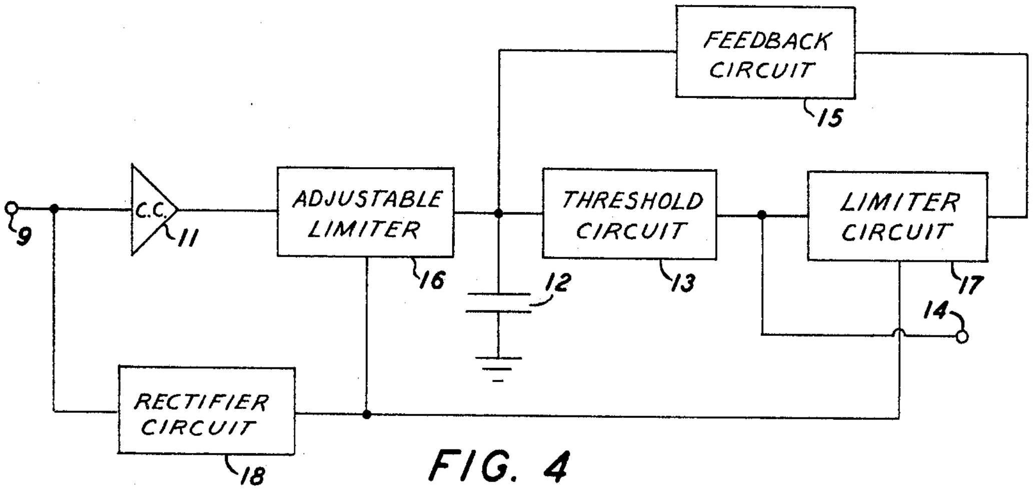
FIG. 4 is a block diagram of my invention.

FIG. 4 is a block diagram of an arrangement of circuits which may be used to carry out the decoding scheme generally suggested above. The dicode signal appearing at input terminal 9 is integrated in some manner. This may be done in various ways. The conventional way is to convert the input voltage waveform into a corresponding current waveform and apply this curent to a capacitor. A high value resistor will convert a voltage into a current under appropriate conditions, but there is illustrated a constant current amplifier 11 which provides an output current proportional to input voltage and substantially independent of output voltage. This current from amplifier 11 is supplied to an integrating capacitor 12 to produc a waveform similar to that of FIG. 3. An adjustable limiter 16 may also be included to limit the voltage on capacitor 12. The function of this limiter will be described later on. The integrated waveform is then applied to a threshold circuit 13 to recreate a two-level signal corresponding to that of FIG. 1. The term "threshold circuit" is used in this specification and claims to indicate a circuit or device having two output levels, one for input signals below a reference threshold level and the other for input signals above the same reference threshold level. A Schmitt trigger circuit is one common embodiment of threshold circuit 13. A simple grounded emitter transistor amplifier will also function as threshold circuit since its collector potential will be at either the emitter potential or the collector supply potential depending on whether the base potetnial is greater than or less than the emitter potential. There is, of course, a range of base potential in which the collector potential responds linearly, rather than step-wise, but it is possible to ignore this limited range of linear operation and consider a grounded emitter transistor or similar device as constituting a threshold circuit within the meaning of this specification and claims.

The circuit as described to this point gives good rejection of randomly occurring noise signals for reasons previously described. It is also capable, in principle, of handling a range of input signal amplitudes without introducing time variations to the output signal. This is apparent from reference to FIG. 3 where it can be seen that the integrated dicode waveform will pass through zero at a time corresponding to the peak amplitude of a symmetrical input pulse regardless of the amplitude of the pulse. This assumes only that all pulses in a given short time have the same amplitude. However, a series of small noise pulses having the same polarity may be integrated by capacitor 12 to a potential above the threshold of circuit 13 to give a false output signal, even though the amplitude or energy of the individual noise pulses is substantially less than that of a true signal pulse. Immunity to this type of noise is provided by feedback circuit 15 which provides feedback current to capacitor 12 in a positive sense from the output of threshold circuit 13 by way of a limiter 17. The effect of feedback circuit 15 is to cause the potential on capacitor 12 to return towards its previous value after each noise pulse. More specifically, the potential on capacitor 12 is returned toward one of two specific values determined by limiter circuit 17 and feedback circuit 15. From a different point of view, the difference between the two-level output signal and the voltage on capacitor 12 is integrated and added to the voltage on capacitor 12. Feedback circuit 15 should be adjusted so that the potential on capacitor 12 responds much more slowly to an increment of voltage on the capacitor itself than to an increment of voltage applied at the input of amplifier 11. This prevents feedback circuit 15 from interfering with the normal function of the circuit to generate output transitions in response to input pulses of normal size. Feedback circuit 15 should, however, be capable of changing the potential at capacitor 12 as rapidly as posible without interfering with the normal signal integration process. Feedback circuit 15 may be a simple resistance network which provides an exponential type of restoration to capacitor 12.

The dicode signal appearing at input terminal 9 is also applied to a rectifier circuit 18 which produces a DC output signal proportional to the peak amplitude of the input signal. The output of rectifier 18 is used to control the symmetrical limiting values of limiters 16 and 17. Limiter 16 may be used to limit the voltage excursions on capacitor 12 to some fraction of the value which would be reached in the absence of limiter 16. The practical reasons for using limiter 16 will be described in connection with FIG. 5. In many cases, however, it may be eliminated. Limiter 17 is also under the control of rectifier 18 and is used to convert the output signal appearing at terminal 14 to a pair of adjustable voltages which are symmetrical with respect to ground. If limiter 16 is employed, then limiter 17 will ordinarily provide the same voltage outputs as limiter 16. If limiter 16 is omitted, then limiter 17 will be set to supply the peak voltages reached by capacitor 12. Both limiters will limit to values proportional to the amplitude of the input signal because they are controlled by rectifier 18. Thus, feedback circuit 15 always tends to drive the voltage on capacitor 12 back to the value representative of integrated input signal.

Figure 5:
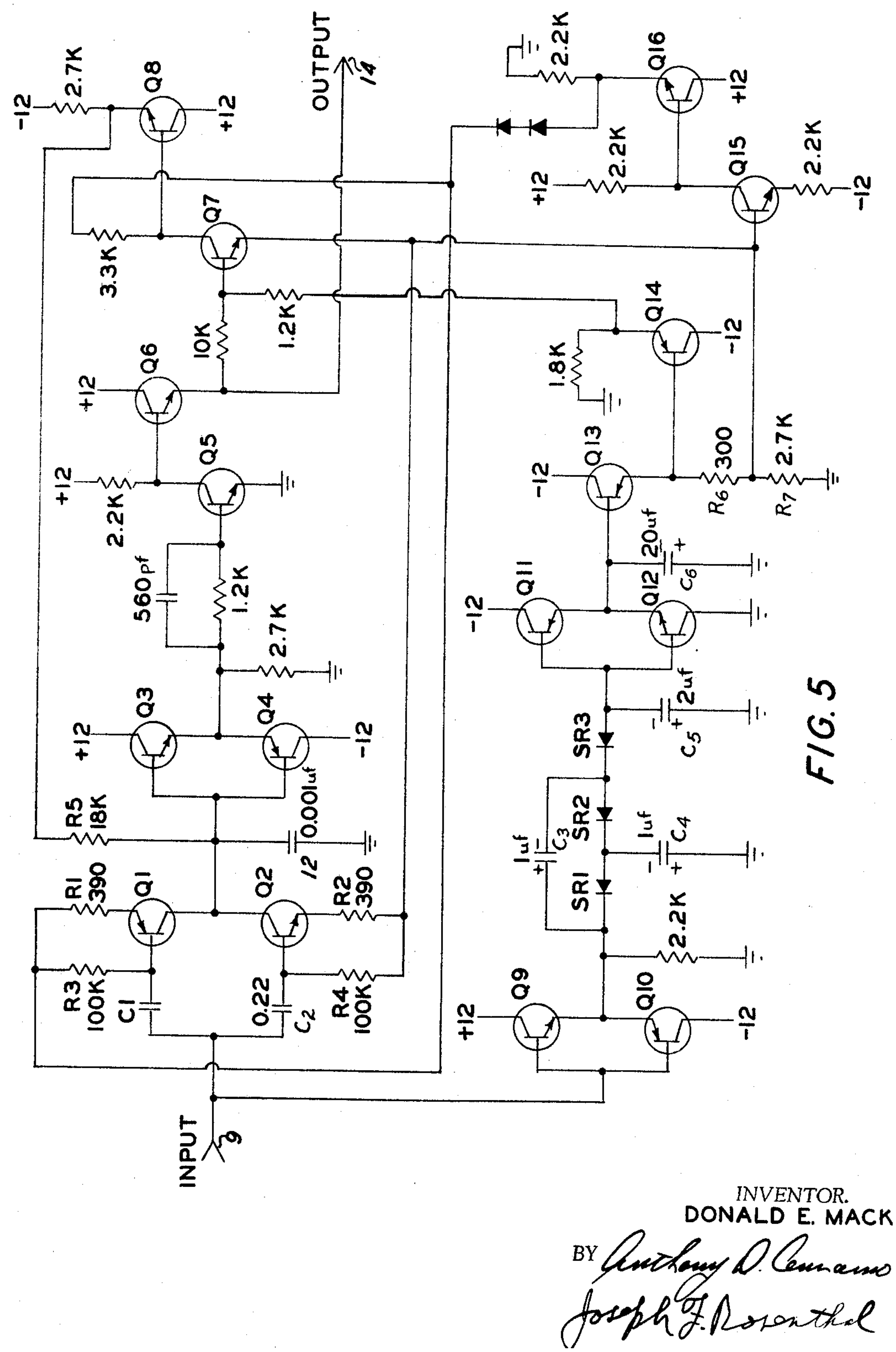
FIG. 5 is an illustrative circuit diagram.

FIG. 5 represents a specific illustrative circuit for carrying out my invention. The NPN and PNP transistors can be of type 2N1304 and 2N1305 respectively. Transistors Q1 and Q2 and associated components comprise the constant current amplifier 11 of FIG. 4. Q1 is a PNP transistor and Q2 is an NPN transistor. Their collectors are connected to integrating capacitor 12. It is characteristic of a high gain transistor that the emitter and collector currents are substantially equal. It is also characteristic of a transistor amplifier that the base emitter voltage is small and essentially constant. Accordingly, the emitter current in Q1 is essentially the base voltage divided by the emitter resistor R1, and similarly the emitter and collector current of Q2 is the base voltage divided by the emitter resistor R2. R1 and R2 are normally equal to each other. If the input signal does not contain any DC component, as is true of dicode signals, it is convenient to AC couple the input signals to the bases of transistors Q1 and Q2, by coupling capacitors C1 and C2 respectively. This in turn permits the transistor bases to be referenced to the plus and minus supply voltage by base resistors R2 and R4 respectively. The time constant of C1 and R3 and of C2 and R4 should be long enough to pass the input pulses without distortion. In general, transistor Q1 will supply capacitor 12 with a current proportional to negative input pulses and transistor Q2 will supply capacitor 12 with a current proportional to positive input pulses. The voltage on capacitor 12 will thus be the negative integral of the input voltage appearing at input terminal 9.

Transistors Q1 and Q2 are operated from supply voltages designated ±V and —V respectively. These voltages are symmetrical with respect to ground and are derived from a rectifier circuit to be described later. The illustrated integrator circuit will not drive capacitor 12 to a voltage greater than +V or less than —V. Accordingly, this circuit can also function as the limiter 16 of FIG. 4.

The voltage on capacitor 12 is passed, via a high input impedance emitter follower composed of transistors Q3 and Q4, to the base of transistor Q5. Since the emitter of Q5 is grounded, the collector potential switches between ground potential and supply potential as the base potential passes through ground. Since Q5 is an NPN transistor, its collector potential falls to zero when its base potential is positive and its collector potential rises to the value of the positive collector supply voltage when the base voltage is negative. The collector of transistor of Q5 is connected to the base of transistor Q6 which is connected as an emitter follower. The emitter of Q6 may be considered as the output terminal 14 and provides a constant amplitude two-level output signal, the levels being zero and plus 12 volts, which corresponds to that of FIG. 1.

Since the output signal at terminal 14 varies in a direction opposite to that of capacitor 12, this signal is inverted by common emitter transistor Q7 and reduced in impedance by emitter follower Q8. The voltage appearing at the emitter of Q8 is at one of two levels which are symmetrical about zero. These potentials are essentially those determined by the plus and minus supply voltages supplied to transistor Q7, which are the same input impedance buffer amplifier comprised of transistors Q1 and Q2. The emitter of Q8 is connected to integrating capacitor 12 by a resistor R5. Accordingly, capacitor 12 always tries to charge up to or down to the emitter potential of Q8. The emitter potential of Q8, however, is exactly the potential to which capacitor 12 is driven by an ordinary noise-free input pulse. This provides the impulse noise rejection previously referred to.

The input signal at terminal 9 is also applied to a rectifier circuit consisting of transistors Q9 and Q16 and associated components. A signal is first applied to a high input imepdance buffer amplifier comprised of transistors Q9 and Q10. The output of Q9 and Q10 is applied to a voltage tripler rectifier consisting of diodes SR1, SR2 and SR3 and capacitors C3, C4 and C5. The rectified voltage is applied through a buffer amplifier consisting of transistors Q11 and Q12 to a filter capacitor C6. The rectified and filtered voltage is applied to an emitter follower Q13 and a fraction of the output voltage of Q13, slightly less than unity, is selected by a voltage divider consisting of R6 and R7 and constitutes the variable supply voltage previously referred to as —V. This voltage is also applied to a transistor Q15 which is operated as a balanced phase inverter with equal emitter and collector loads. The voltage appearing at the collector of Q15 is substantially equal in magnitude but opposite in polarity to that appearing at the base. The collector of Q15 is connected to the base of an emitter follower Q16, the output of which corresponds to the variable supply voltage previously designated as +V. In addition, the emitter of transistor Q13 is connected to an emitter follower Q14 which provides an output voltage slightly more negative than that designated —V. This voltage is used as the base return voltage for transistor Q7. Since the emitter of transistor Q7 is returned to —V, this insures a more certain turnoff of transistor Q7.

It was previously noted that the integrated voltage on capacitor 12 will pass through zero at a time corresponding to the peak amplitude of a symmetrical input pulse regardless of the amplitude of the pulse. This statement may not be completely accurate when applied to a simple low voltage integrator circuit as shown in FIG. 5, instead of to an idealized perfect integrator. In a practical integrator, the output of the constant current generator is likely to be somewhat dependent on output voltage as well as upon input voltage. This departure from idealized performance can be overcome by operating transistors Q1 and Q2 from a variable voltage supply such that the integrated signal voltage on capacitor 12 bears a fixed relation to the supply voltage in spite of varying input signal voltage. This is accomplished in the circuit of FIG. 5 by supplying operating transistors Q1 and Q2 from voltages derived from the rectified input signals. It has also been found desirable to limit the voltage applied to capacitor 12 by transistors Q1 and Q2 to a value slightly less than would be achieved in normal linear operation of the circuit. This represents a desirable, although not an essential operating condition because each input pulse causes the voltage on capacitor 12 to be integrated upwards or downwards from a fixed, determined potential. This is accomplished by adjusting the value of voltages +V and —V relative to the input signal amplitude or by adjusting resistors R1 and R2 or capacitor 12 to provide the proper limiting action. Feedback circuit 15 should also be fed from a source of potential having about the same value as the potential to which capacitor 12 is limited by transistors Q1 and Q2. This is accomplished in the circuit of FIG. 5 by feeding transistors Q1, Q2 and Q7 from the same set of variable supply voltages.

Figure 6:
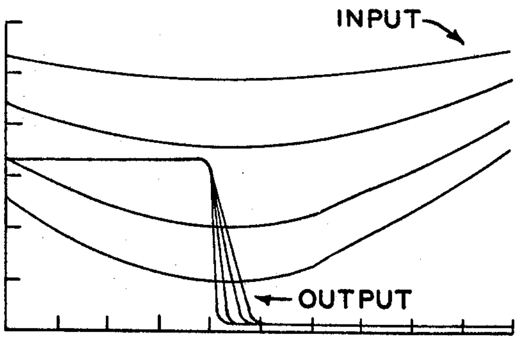
FIG. 6 represents waveforms indicative of different signal amplitudes.

FIG. 6 is a series of waveforms illustrating the tolerance of variable input amplitudes achieved in the present invention. Each horizontal scale division represents one microsecond and each vertical scale division represents one volt at input 9. The waveforms labeled "input" represent a set of oscilloscope waveforms corresponding to negative-going dicode pulses having a nominal length of 20 microseconds and amplitudes varying over a range of 5 to 1. The curves labeled "output" represent corresponding output transitions corresponding to the input waveforms. It can be seen that the output transitions have constant voltage swing and occur at a substantially uniform time with respect to the input waveforms. Small variations in the output waveform are due to the characteristics of the simple threshold circuit used in FIG. 5 and could be substantially eliminated by using a higher gain threshold circuit or a regenerative threshold circuit such as a Schmitt trigger.

It will be understood that the drawings and the preceding description are intended to be illustrative only. Variations in the described circuitry will be obvious to those skilled in the electronic art.

What is claimed is:

1. The method of decoding a three-level dicode signal comprising integrating said dicode signal to form an integrated dicode signal, generating a first constant amplitude two-level signal from said integrated dicode signal, said first two-level signal being determined by the sign of the difference between said integrated signal and a fixed potential, generating a second variable amplitude two-level signal from said integrated dicode signal, said second two-level signal being determined by the sign of the difference between said integrated dicode signal and said fixed potential and being proportional to the amplitude of said dicode signal, integrating the difference between said second two-level signal and said integrated dicode signal to form an integrated error signal, and adding said integrated error signal to said integrated dicode signal to form a sum thereof.

2. A dicode signal decoding system comprising a current generator circuit for providing an output current proportional to the voltage of a dicode input signal, an integrating capacitor connected to said current generator circuit, a first threshold circuit connected to said integrating capacitor and having a switching threshold at the median potential of said capacitor, said first threshold circuit producing a two-level signal of amplitude proportional to said input signal and of polarity determined by the sign of the difference between the potential on said capacitor and a fixed potential, a feedback circuit connecting said first threshold circuit to said integrating capacitor, a rectifier circuit for producing an output signal proportional to the peak amplitude of the dicode input signal, and a limiter coupled to said rectifier circuit and said integrating capacitor for limiting the value of the two-level signal produced by said first threshold circuit, said rectifier circuit controlling the symmetrical limiting values of said limiter.

3. In a graphic communication system wherein binary information is transmitted as a three-level dicode signal, a dicode decoder comprising constant current amplifier means in conjunction with an integrating capacitor for integrating said dicode signal, threshold circuit means responsive to said integrated dicode signal having a switching threshold at the median potential of said integrating capacitor for generating the decoded binary information, rectifier means for producing an output signal proportional to the peak amplitude of the dicode input signal, limiter circuit means coupled to said rectifier means and said integrating capacitor for limiting the value of the decoded binary information, said rectifier means controlling the symmetrical limiting values of said limiter circuit means, and feedback circuit means coupled to the output of said limiter circuit means and said integrating capacitor for limiting the effects of noise pulses in the dicode signal.

4. The decoder as set forth in claim 3 further including second limiter circuit means for adjustably limiting the voltage excursions on said integrating capacitor to a predetermined fraction of the value of said voltage excursions.

References Cited

UNITED STATES PATENTS

| | | | |
|---|---|---|---|
| 2,632,053 | 3/1953 | Volz | 328—127 |
| 2,885,662 | 5/1959 | Hansen | 328—127 |
| 3,072,856 | 1/1963 | Close | 328—127 |
| 3,303,425 | 2/1967 | Pendleton | 328—127 |

ROBERT L. GRIFFIN, Primary Examiner

J. A. BRODSKY, Assistant Examiner

U.S. Cl. X.R.

178—88; 325—38, 42, 323; 328—127